Patented July 18, 1933

1,918,454

UNITED STATES PATENT OFFICE

JAMES W. DEAN AND JOHN H. DEAN, OF KNOXVILLE, TENNESSEE, ASSIGNORS TO KNOXVILLE FERTILIZER CO., OF KNOXVILLE, TENNESSEE, A CORPORATION OF TENNESSEE

BASED AMMONIUM SULPHATE FERTILIZER AND PROCESS OF MAKING THE SAME

No Drawing.    Application filed June 30, 1932.   Serial No. 620,288.

The present invention relates to an improved form of fertilizer containing a predominating amount of ammonium sulphate. The product is characterized; (1) by remaining in a free-running, granular and non-lumpy condition, and (2) by carrying basic material to offset the production of acidity.

One of the objects of the invention is to produce a commercial form of ammonium sulphate fertilizer which differs from ordinary ammonium sulphate by remaining in a free-running and superior mechanical condition so that it will keep in first-class condition either for use in a fertilizer drill or for application by any other means. This is accomplished by incorporating with the ammonium sulphate comparatively small amounts of other materials which bring about the desired effect. It was found that the acidity from the ammonium sulphate could be corrected by adding thereto a certain amount of dolomite and that with the further addition of a vegetable material, such as peanut-hull meal, cottonseed meal, tobacco dust, or tobacco-stem meal, a grindable mixture was obtained. However, when ground, the mixture would soon cake or harden until it required regrinding or other means for breaking it up before it was suitable for agricultural use. The problem was solved by our discovery that the addition of a very small amount of acid phosphate (superphosphate) to this mixture would completely prevent the caking and would allow the material to remain in a free-running condition.

A desirable formula is as follows: 50 lbs. of acid phosphate (superphosphate), 75 lbs. of peanut hull meal (or its equivalent as above mentioned), 375 lbs. of ground dolomite, and 1500 lbs. of commercial ammonium sulphate.

The invention therefore contemplates the above formula and its reasonable equivalents, the object being to produce a product analyzing approximately 15% of nitrogen, which is about equivalent in fertilizer value to ordinary sodium nitrate, but having superior advantages over said product because of its markedly improved mechanical condition and simplicity of use.

Furthermore, the presence of the dolomite in the mixture offsets any acidity which might be contributed to the soil by the ammonium sulphate.

The process of producing the material consists in mixing the stated amount of ammonium sulphate and the other ingredients and grinding them together until a homogeneous finely ground product is obtained. This product will remain in a free-running condition without setting up into a hard caked mass under all ordinary storage conditions and when placed in bags it does not attack or deteriorate the latter.

While the amount of acid phosphate given is 50 lbs., this may be increased to 100 lbs. or more, but substantially the formula above given is at this time the most serviceable and saleable.

Saving for themselves the use of obvious equivalents, what the inventors desire to protect by Letters Patent is the following:

1. A commercial fertilizer comprising a greatly predominant amount of ammonium sulphate in admixture with smaller amounts of acid phosphate (superphosphate), comminuted vegetable material, and dolomite.

2. A commercial fertilizer comprising a major portion of ammonium sulphate and a minor portion of acid phosphate, and a vegetable material selected from the group consisting of peanut-hull meal, cottonseed meal, tobacco dust, tobacco-stem meal and dolomite.

3. A commercial fertilizer consisting of 1500 lbs. of ammonium sulphate, 50 lbs. of acid phosphate, 75 lbs. of vegetable material, and 375 lbs. of dolomite.

4. A freely-running fertilizer material consisting of the following formula:—1500 lbs. of ammonium sulphate, 50 lbs. of acid phosphate, 75 lbs. peanut-hull meal, and 375 lbs. of dolomite, all ground to a fineness sufficient to produce a free-running product.

JAMES W. DEAN.
JOHN H. DEAN.